United States Patent
Kim

(10) Patent No.: US 8,340,882 B2
(45) Date of Patent: Dec. 25, 2012

(54) METHOD OF CONTROLLING DRIVE REQUEST TORQUE IN HYBRID ELECTRIC VEHICLE

(75) Inventor: Jeong Eun Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 986 days.

(21) Appl. No.: 12/152,159

(22) Filed: May 12, 2008

(65) Prior Publication Data

US 2009/0157243 A1     Jun. 18, 2009

(30) Foreign Application Priority Data

Dec. 13, 2007  (KR) .................. 10-2007-0129914

(51) Int. Cl.
*B60L 11/00*     (2006.01)
*G06F 17/00*     (2006.01)

(52) U.S. Cl. ............... 701/90; 701/22; 701/54; 701/84; 701/99; 701/110

(58) Field of Classification Search .................. None
See application file for complete search history.

(56) References Cited

U.S. PATENT DOCUMENTS

| | | | |
|---|---|---|---|
| 5,989,153 A * | 11/1999 | Fischer et al. | 477/74 |
| 6,278,915 B1 * | 8/2001 | Deguchi et al. | 701/22 |
| 6,847,877 B2 * | 1/2005 | Homeyer | 701/51 |
| 6,895,941 B2 * | 5/2005 | Matthews et al. | 123/481 |
| 7,428,457 B2 * | 9/2008 | Stroh | 701/51 |
| 2008/0236911 A1 * | 10/2008 | Yamamoto et al. | 180/65.2 |
| 2009/0005923 A1 * | 1/2009 | Shimizu et al. | 701/22 |
| 2009/0062063 A1 * | 3/2009 | Yamanaka et al. | 477/5 |
| 2009/0112439 A1 * | 4/2009 | Kuang et al. | 701/99 |

FOREIGN PATENT DOCUMENTS

| | | |
|---|---|---|
| JP | 2001-025109 A | 1/2001 |
| JP | 2002-091073 | 3/2002 |
| JP | 2002-142302 | 5/2002 |
| JP | 2002-142304 | 5/2002 |

* cited by examiner

*Primary Examiner* — Khoi Tran
*Assistant Examiner* — Bao Long T Nguyen
(74) *Attorney, Agent, or Firm* — Edwards Wildman Palmer LLP; Peter F. Corless

(57) ABSTRACT

The present invention provides a method of controlling a driver request torque in a hybrid electric vehicle, in which a driver request torque is calculated by determining that a driver has an intention to accelerate, if an accelerator opening degree detected by an accelerator pedal position sensor (APS) is greater than 0% when the accelerator pedal is depressed by the driver who intends to re-accelerate after coasting or decelerating, and a torque discontinuity, which may be caused when the APS is turned on→off→on according to the depression operation of the accelerator pedal by the driver, is controlled using an up/down torque rate limit logic, thus preventing deterioration of driving performance.

For this purpose, the present invention provides a method of controlling a driver request torque in a hybrid electric vehicle, the method including: monitoring a vehicle speed; calculating a maximum torque with respect to the vehicle speed; monitoring an APS; and calculating a driver request torque by determining that a driver has an intention to accelerate and recognizing a minimum request torque as 0 Nm, if an opening degree of the APS is greater than 0%.

3 Claims, 4 Drawing Sheets

METHOD OF CONTROLLING DRIVE REQUEST TORQUE IN HYBRID ELECTRIC VEHICLE

CROSS-REFERENCE TO RELATED APPLICATION

This application claims under 35 U.S.C. §119(a) the benefit of Korean Patent Application No. 10-2007-0129914 filed Dec. 13, 2007, the entire contents of which are incorporated herein by reference.

BACKGROUND (a) Technical Field

The present invention relates to a method of controlling a driver request torque in a hybrid electric vehicle, which can provide a rapid response to the driver request and control a torque discontinuity.

(b) Background Art

A hybrid electric vehicle (HEV) using a motor drive source as an auxiliary power source as well as an internal combustion engine reduces exhaust gas and improves fuel efficiency. The HEV can be driven in an EV mode, which is directed to a purely electric vehicle mode using motor power only, an HEV mode, which is an auxiliary mode using the rotational force of the motor as an auxiliary power source with the use of the rotational force of the engine as a main power source, and a regenerative braking (RB) mode, in which the energy produced when braking the vehicle or the vehicle is driven by inertia is recovered by the motor and charged in a battery. A creep travel mode after a stop is performed by the EV mode.

For the respective driving modes, the logic for calculating a driver request torque should accurately reflect a driver's intention. For the vehicle to be driven as the driver desires, driver's intention to speed up or down the vehicle or maintain a current speed of the vehicle needs to be accurately reflected in the logic. Accordingly, the accuracy of the driver request torque calculation is essentially required for the logic implementation of the HEV.

The factors to be used in interpreting the driver's intention include depression degrees (depths) detected by an accelerator pedal position sensor (APS) and a brake pedal position sensor (BPS). In general, the depression degree of the APS is increased when the driver intends to accelerate, and the depression degree of the BPS is increased when the driver intends to decelerate.

In addition, to calculate a driver request torque that meets the driver's intention and the vehicle system, a transmission shift or a vehicle speed also may need to be reflected.

Moreover, the driver request torque is calculated so that the vehicle can rapidly respond to the driver's intention to accelerate or decelerate the vehicle or maintaining a current speed of the vehicle.

Here, a conventional method of calculating a driver request torque will be described below.

FIG. 3 is a flowchart illustrating a conventional method of calculating a driver request torque. As shown in FIG. 3, the conventional method of calculating a driver request torque comprises the steps of monitoring a vehicle speed, calculating a maximum torque with respect to the vehicle speed, calculating a minimum torque (for a creep travel) with respect to the vehicle speed, monitoring an APS, and calculating a driver request torque according to the APS.

The control and the calculation of the driver request torque are performed by a hybrid control unit (HCU) which is a main controller of the HEV, and a motor control unit (MCU) for controlling the motor.

The conventional method has a drawback, however, which is described with reference to FIG. 4.

FIG. 4 is a torque diagram illustrating an example of calculating the driver request torque.

First, a maximum torque (engine+motor maximum torque) and a minimum torque (motor torque for a creep travel) with respect to a vehicle speed are calculated and, at the same time, an opening degree of the APS is monitored. The term "opening degree" is defined as a depression degree (depth) of the accelerator pedal detected by an APS and is represented as %.

Next, while the minimum torque is matched to 0% of the APS and the maximum torque is matched to 100% of the APS, a driver request torque is obtained according to the calculated vehicle speed and the opening degree of the APS.

In the conventional method of calculating the driver request torque, when, in case where the APS is 0% during vehicle operation, the accelerator pedal is slightly depressed by the driver who intends to accelerate, it is determined that there is no driver request torque and thus the driver request torque is calculated as zero or a negative value. As a result, the response of the vehicle to the driver request torque may be delayed.

For example, in the event that the vehicle speed is 60 kph and the APS is 50% (assuming that the maximum torque is 200 Nm and the minimum torque is −60 Nm at a vehicle speed of 60 kph), the driver request torque is 70 Nm, which has been calculated by determining that there is a driver request torque. However, in the event that the APS is 23%, the driver request torque is calculated as 0 Nm, and in the event that the APS is 10%, the driver request torque is calculated as −47 Nm, thus failing to provide a response that satisfies the driver request torque.

That is, even though the accelerator pedal is depressed by the driver's intention of acceleration at an APS of 10%, the driver request torque is calculated as a negative value, or even though the accelerator pedal is depressed at an APS of 23%, the driver request torque is calculated as 0 Nm, thus failing to provide a rapid response when the driver intends to re-accelerate after coasting (APS=0%) or decelerating.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art.

In one aspect, the present invention provides a method of controlling a driver request torque in a hybrid electric vehicle, the method comprising: monitoring a vehicle speed; calculating a maximum torque with respect to the vehicle speed; monitoring an accelerator pedal position sensor (APS); and calculating a driver request torque by determining that a driver has an intention to accelerate and recognizing a minimum request torque as 0 Nm, if an opening degree of the APS is greater than 0%.

In a preferred embodiment, if the opening degree of the APS is 0%, the minimum torque with respect to a vehicle speed is determined as a creep torque.

In another preferred embodiment, an up/down torque rate limit logic is performed to limit a discontinuous change in torque caused when the APS is turned on→off→on according to the driver's accelerator pedal operation.

In still another preferred embodiment, a range of up/down torque rate limit values by the up/down torque rate limit logic is set to an appropriate level in consideration of acceleration performance and driving performance.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Figure 1:
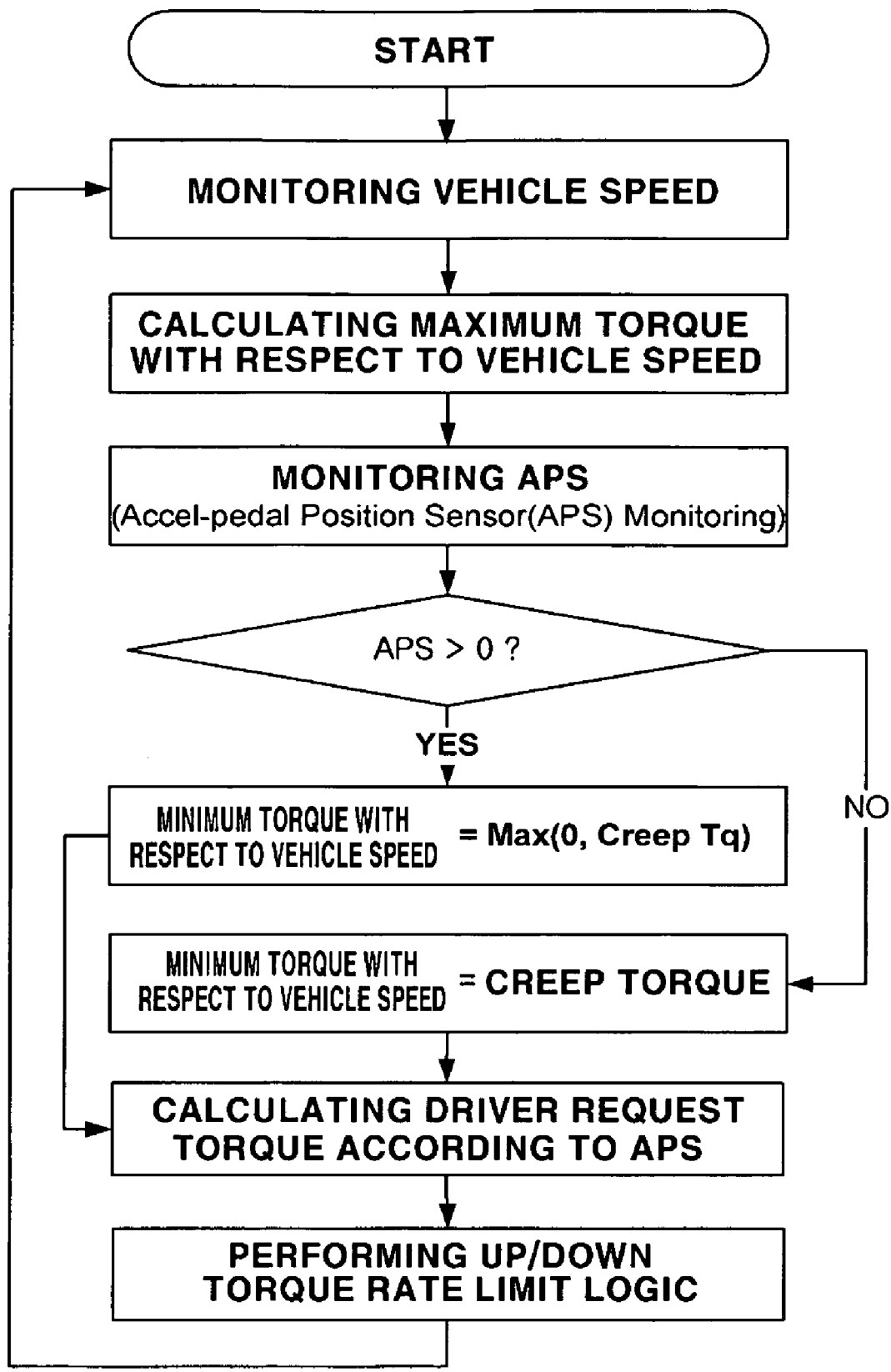
FIG. 1 is a flowchart illustrating a method of controlling a driver request torque in a hybrid electric vehicle in accordance with the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

Figure 2:
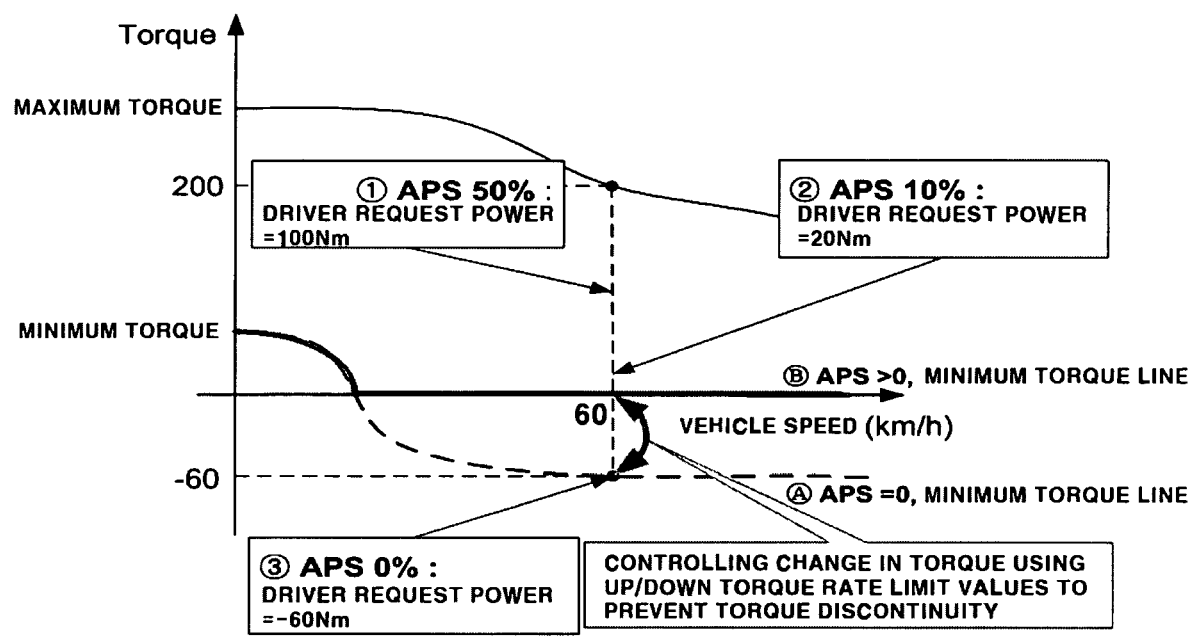
FIG. 2 is a torque diagram illustrating the method of controlling the driver request torque in the hybrid electric vehicle in accordance with the present invention.
Figure 3:
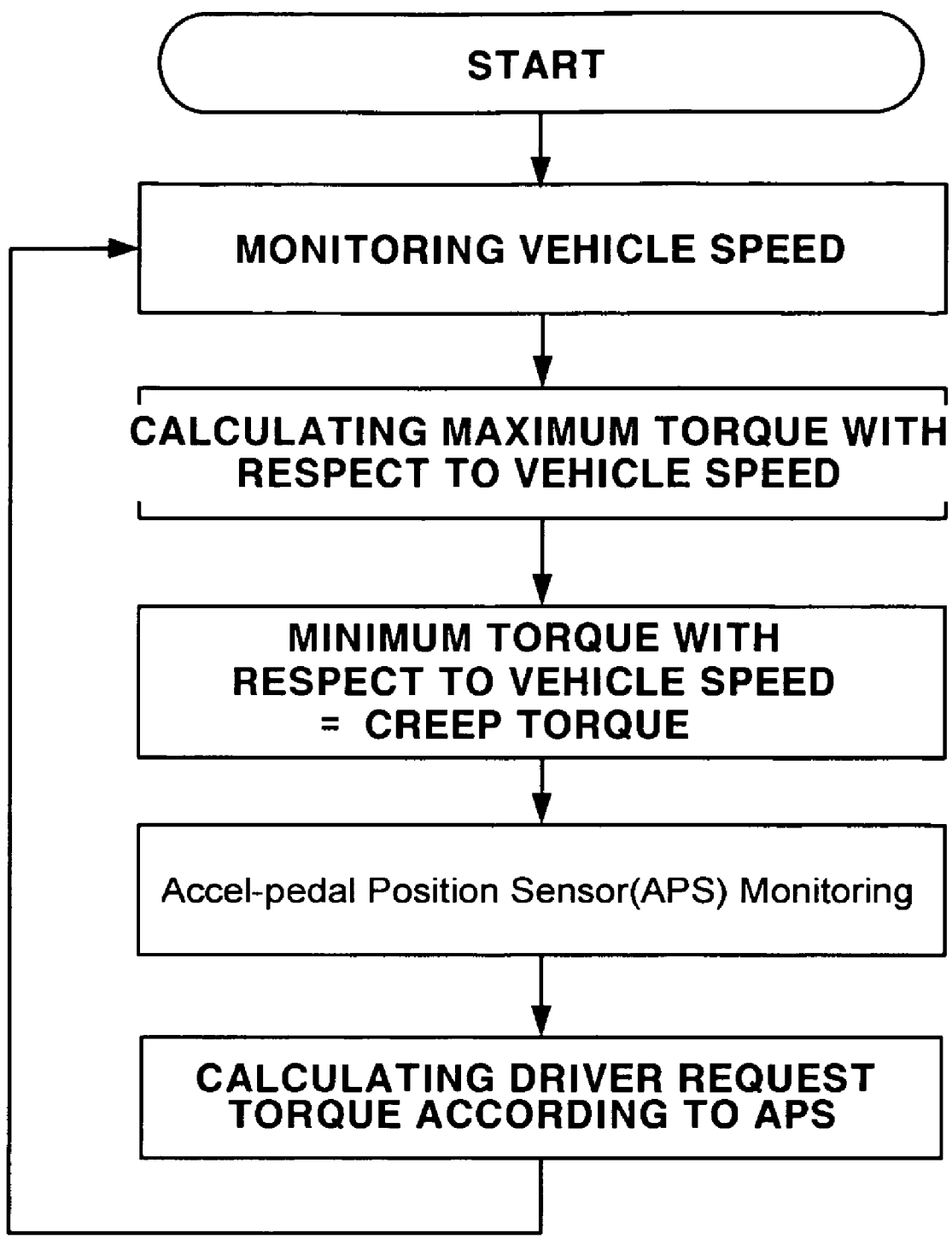
FIG. 3 is a flowchart illustrating a conventional method of calculating a driver request torque.
Figure 4:
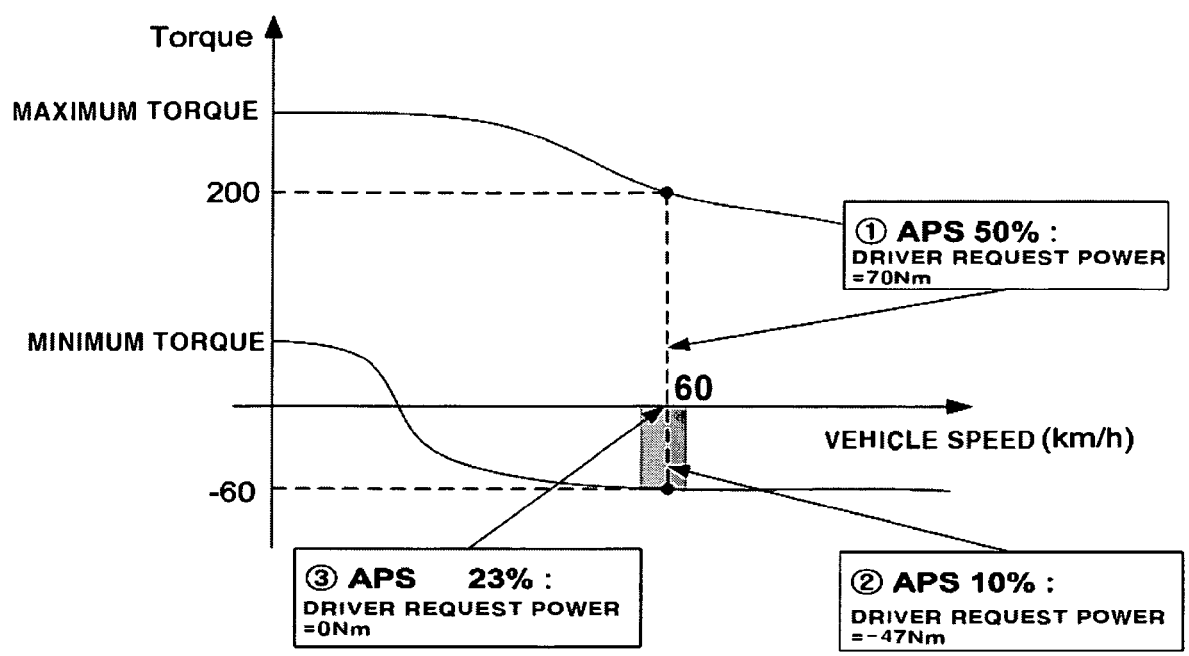
FIG. 4 is a torque diagram illustrating an example of calculating the driver request torque.

FIG. 1 is a flowchart illustrating a method of controlling a driver request torque in a hybrid electric vehicle in accordance with the present invention, and FIG. 2 is a torque diagram illustrating the method of controlling the driver request torque in the hybrid electric vehicle in accordance with the present invention.

First, when a vehicle speed is monitored by a vehicle speed sensor and a monitored signal is transmitted to an, which is a main controller of the HEV, an MCU calculates a maximum torque with respect to the vehicle speed.

At the same time, an accelerator opening degree detected by an APS is monitored, and a monitored signal is transmitted to the HCU.

In this case, if the opening degree detected by the APS is greater than 0%, the HCU calculates a driver request torque by determining that there is a driver's intention of acceleration and recognizing a driver's minimum request torque as 0 Nm.

If the opening degree of the APS is 0%, the minimum request torque of the driver is determined as a creep torque, which is a minimum torque with respect to the vehicle speed and a driver request torque required when the vehicle is in a creeping travel mode after a stop.

The method of controlling the driver request torque in the HEV in accordance with the present invention will be described in more detail with respect to FIG. 2.

For example, in the event that the vehicle speed is 60 kph and the APS is 10% (assuming that the maximum torque is 200 Nm and the minimum torque is −60 Nm at a vehicle speed of 60 kph), the driver request torque is calculated as 20 Nm.

As described above, in the conventional method, if the APS is 10%, it is determined that the driver has no intention to accelerate, and thus the driver request torque is calculated as −47 Nm. However, according to the present invention, in the case where the driver who has an intention to accelerate depresses the accelerator pedal at an accelerator opening degree of 10%, the driver request torque is calculated as 20 Nm, thus providing a rapid response when the driver intends to re-accelerate after coasting or decelerating.

As a result, according to the present invention, when the driver intends to accelerate, i.e., when the APS is greater than 0%, the drive request torque is always greater than 0, thereby making it possible to provide a rapid response.

Meanwhile, in the case where the driver repeats the accelerator depression operation, i.e., when the monitored value of the APS is rapidly changed such as APS on→APS off→APS on, a change in torque occurs frequently, which may result in deterioration of driving performance due to a torque discontinuity.

According to the present invention, if the opening degree of the APS is greater than 0%, it is determined that the driver has an intention to accelerate, and an up/down torque rate limit logic is added to the HCU so as to prevent such a frequent change in torque.

A situation that the monitored value of the APS is rapidly changed from APS-on to APS-off or from APS-off to APS-on as per the drivers' request could be simulated as follows. For example, provided a sampling period for collecting data is configured to 0.01 seconds; vehicle speed is 60 KPH and APS is 0 at a first sampling time (sample time 1); and vehicle speed is 60 KPH and APS is 10 at a subsequent second sampling time (sample time 2), then the driver's request torque would be −60 Nm at the first sampling time and 20 Nm at the second sampling time.

If the driver request torque is increased by 80 Nm (i.e., from −60 Nm to 20 Nm) for 0.01 seconds, the acceleration performance is high, but there may be a problem in the driving performance. Accordingly, in calculating the driver request torque, up/down torque rate limit values are determined in consideration of the driving performance and acceleration performance.

If the range of the up/down torque rate limit values are set to be large, the acceleration performance is good, but the driving performance is bad, whereas, if the range is set to be small, the change in torque is small to deteriorate the acceleration performance. Accordingly, the up/down torque rate limit values should be set to an appropriate level by considering the above.

For example, if an up torque rate limit value is 40 Nm, the final driver request torque at the sample 2 with respect to the driver request torque of −60 Nm at the sample time 1 is calculated as −20 Nm (as opposed to 20 Nm) by the calculation of −60 Nm+40 Nm, and thus it is possible to limit the driver request torque in consideration of the acceleration performance and driving performance.

Like this, in the case where that the driver has an intention to accelerate (APS>0%) when he or she intends to re-accelerate after coasting or decelerating, the driver request torque is calculated as a value greater than 0, and thus it is possible to provide a rapid response to the driver request torque. Moreover, in the case where the driver's intention of acceleration occurs frequently (APS on→APS off→APS on), the up/down torque rate limit logic is performed to prevent the deterioration of driving performance due to a torque discontinuity caused when a change in torque occurs frequently.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of controlling a driver request torque in a hybrid electric vehicle, the method comprising:
    monitoring, by a processor, a vehicle speed
    calculating, by the processor, a maximum
    monitoring, by the processor, an accelerator
    calculating, by the processor, a driver request torque by determining that a driver has an intention to accelerate and recognizing a minimum request torque of at least 0 Nm, when the calculated request torque is less than 0 nm and the APS is greater than 0%,
    wherein an up/down torque rate limit logic is performed to limit a discontinuous change in torque caused when the APS is turned on→off→on according to the driver's accelerator pedal operation.

2. The method of claim 1, wherein, if the opening degree of the APS is 0%, a minimum torque with respect to a vehicle speed is determined as a creep torque.

3. The method of claim 1, wherein a range of up/down torque rate limit values by the up/down torque rate limit logic is set to an appropriate level in consideration of acceleration performance and driving performance.

* * * * *